(12) United States Patent
Kato et al.

(10) Patent No.: US 9,825,318 B2
(45) Date of Patent: Nov. 21, 2017

(54) METHOD FOR OPERATING FUEL CELL SYSTEM

(71) Applicant: HONDA MOTOR CO., LTD., Tokyo (JP)

(72) Inventors: Koichi Kato, Wako (JP); Koichi Takaku, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/221,602

(22) Filed: Jul. 28, 2016

(65) Prior Publication Data

US 2016/0336608 A1 Nov. 17, 2016

Related U.S. Application Data

(62) Division of application No. 13/354,328, filed on Jan. 20, 2012, now abandoned.

(30) Foreign Application Priority Data

Jan. 26, 2011 (JP) .................................. 2011-014549

(51) Int. Cl.
*H01M 8/0438* (2016.01)
*H01M 8/04746* (2016.01)
*H01M 8/04082* (2016.01)

(52) U.S. Cl.
CPC ... *H01M 8/04432* (2013.01); *H01M 8/04201* (2013.01); *H01M 8/04388* (2013.01); *H01M 8/04753* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 6,413,662 B1 | 7/2002 | Clingerman et al. | |
| 2003/0022034 A1* | 1/2003 | Suzuki | H01M 8/04089 429/443 |
| 2006/0246177 A1* | 11/2006 | Miki | F17C 5/007 426/24 |

(Continued)

FOREIGN PATENT DOCUMENTS

| | | |
|---|---|---|
| JP | 2006-294341 | 10/2006 |
| JP | 2007-173158 | 7/2007 |
| JP | 2009-064681 | 3/2009 |

OTHER PUBLICATIONS

Japanese Office Action for corresponding JP Application No. 2011-014549, dated Jan. 25, 2013.

(Continued)

*Primary Examiner* — Alix Eggerding
(74) *Attorney, Agent, or Firm* — Mori & Ward, LLP

(57) ABSTRACT

A method for operating a fuel cell system includes detecting a pressure in a fuel supply path located downstream of a pressure reducing valve using a pressure sensor. Whether or not the pressure detected by the pressure sensor exceeds a predetermined threshold pressure is determined. The pressure in the fuel supply path located downstream of the pressure reducing is reduced when the pressure detected by the pressure sensor exceeds the predetermined threshold pressure.

21 Claims, 3 Drawing Sheets

(56) References Cited

U.S. PATENT DOCUMENTS

| | | | | |
|---|---|---|---|---|
| 2007/0193340 A1* | 8/2007 | Yoshida | ............ | H01M 8/04231 |
| | | | | 73/46 |
| 2007/0243426 A1* | 10/2007 | Bono | ................ | H01M 8/04089 |
| | | | | 429/444 |
| 2008/0220303 A1 | 9/2008 | Yoshida | | |
| 2009/0035612 A1* | 2/2009 | Suematsu | ......... | H01M 8/04089 |
| | | | | 429/432 |
| 2011/0045374 A1* | 2/2011 | Ogawa | .............. | H01M 8/04007 |
| | | | | 429/443 |

OTHER PUBLICATIONS

Non-Final Rejection issued by the U.S. Patent and Trademark Office for the parent U.S. Appl. No. 13/354,328, dated Sep. 11, 2015.
Final Rejection issued by the U.S. Patent and Trademark Office for the parent U.S. Appl. No. 13/354,328, dated Mar. 28, 2016.

* cited by examiner

METHOD FOR OPERATING FUEL CELL SYSTEM

CROSS-REFERENCE TO RELATED APPLICATIONS

The present application is a divisional application of the U.S. patent application Ser. No. 13/354,328 filed Jan. 20, 2012, which claims priority to Japanese Patent Application No. 2011-014549 filed Jan. 26, 2011. The contents of these applications are incorporated herein by reference in their entirety.

BACKGROUND OF THE INVENTION

Field of the Invention

The present invention relates to a method for operating a fuel cell system.

Discussion of the Background

In a fuel cell system in the related art that supplies hydrogen gas from a hydrogen gas tank filled with high-pressure hydrogen gas (fuel gas) to a fuel cell via a fuel supply path, a pressure reducing valve provided in the fuel supply path is used to reduce the pressure of the hydrogen gas supplied to the fuel cell (see, for example, Japanese Unexamined Patent Application Publication No. 2009-64681).

Furthermore, in order to improve the reliability of the fuel cell system, there has been proposed a configuration having a function for determining whether or not there is a malfunction in a main stop valve (shut-off valve) that switches between a supply mode and a shut-off mode for the hydrogen gas supplied toward the fuel supply path from the hydrogen gas tank (see, for example, Japanese Unexamined Patent Application Publication No. 2007-173158).

SUMMARY OF THE INVENTION

According to one aspect of the present invention, a method for operating a fuel cell system that includes a fuel cell, a fuel-gas supplier, a fuel supply path connecting the fuel cell to the fuel-gas supplier, a shut-off valve to switch between a supply mode and a shut-off mode for fuel gas supplied toward the fuel supply path from the fuel-gas supplier, a pressure reducing valve provided in the fuel supply path between the shut-off valve and the fuel cell to reduce a downstream pressure relative to an upstream pressure, and a controller, includes detecting a pressure in the fuel supply path located downstream of the pressure reducing valve using a pressure sensor. Whether or not the pressure detected by the pressure sensor exceeds a predetermined threshold pressure is determined. The pressure in the fuel supply path located downstream of the pressure reducing is reduced when the pressure detected by the pressure sensor exceeds the predetermined threshold pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
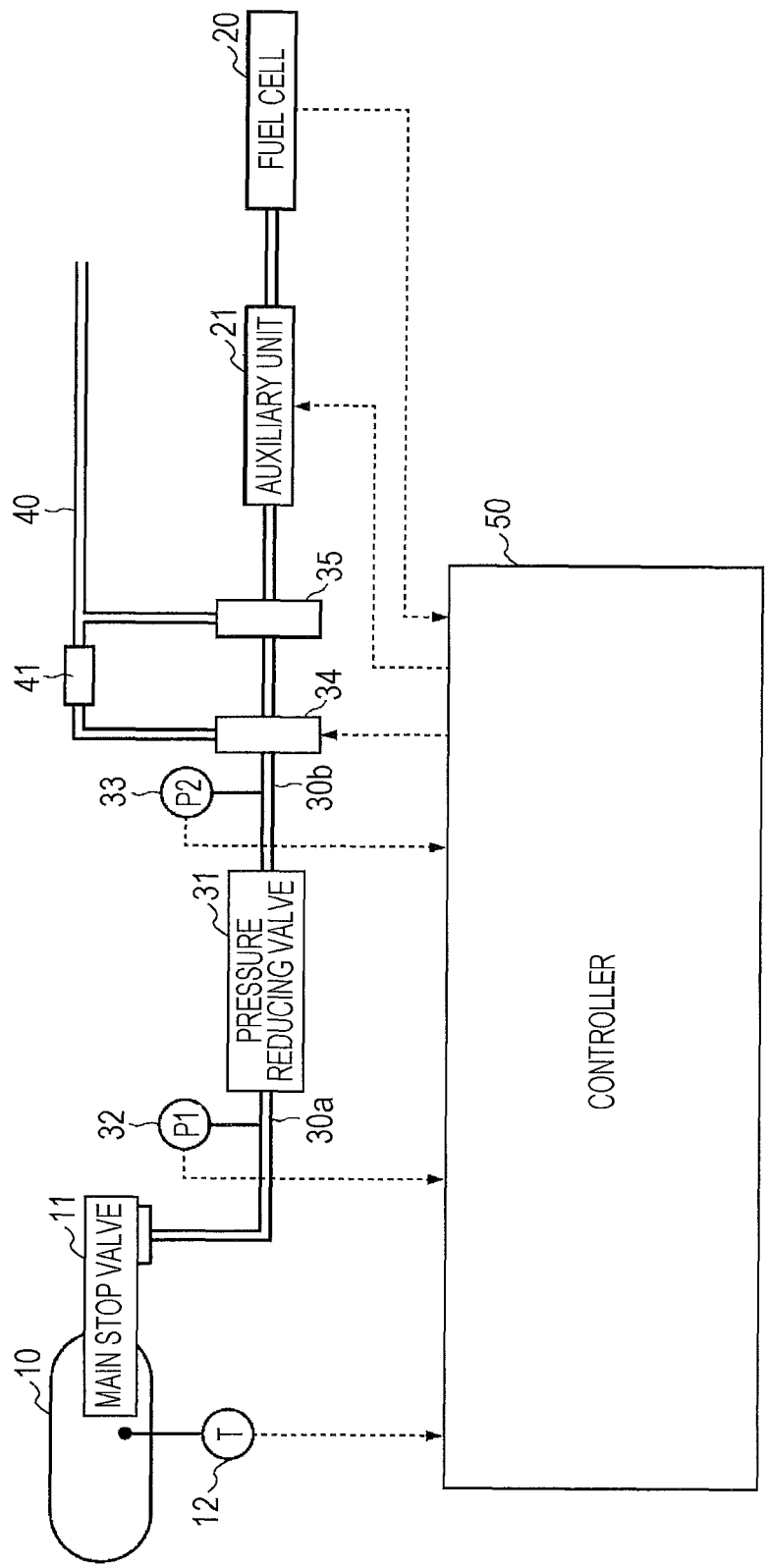
FIG. 1 illustrates the configuration of a fuel cell system according to the embodiment of the present invention.

The embodiments will now be described with reference to the accompanying drawings, wherein like reference numerals designate corresponding or identical elements throughout the various drawings.

The embodiment of the present invention will now be described with reference to FIGS. 1 to 3. Referring to FIG. 1, a fuel cell system according to the present embodiment is mounted in, for example, a fuel-cell-powered vehicle and includes a hydrogen gas tank 10 (corresponding to a fuel-gas supplying section) filled with high-pressure (e.g., several tens of MPa) hydrogen gas (corresponding to fuel gas); a tank temperature sensor 12 that detects the temperature of the hydrogen gas tank 10; a fuel cell 20; an auxiliary unit 21 (including an injector, a humidifier, and a hydrogen pump) for activating the fuel cell 20; fuel supply paths 30a and 30b that connect the hydrogen gas tank 10 to the fuel cell 20; a main stop valve 11 (corresponding to a shut-off valve) that opens and closes the connection between the hydrogen gas tank 10 and the fuel supply path 30a so as to switch between a supply mode and a shut-off mode for the hydrogen gas supplied toward the fuel supply path 30a from the hydrogen gas tank 10; a pressure reducing valve 31 that reduces the pressure of the hydrogen gas within the fuel supply path 30a located upstream thereof and supplies the hydrogen gas to the fuel supply path 30b located downstream thereof; a high-pressure sensor 32 that detects a pressure P1 within the fuel supply path 30a (i.e., the fuel supply path located upstream of the pressure reducing valve 31); an intermediate-pressure sensor 33 (corresponding to a pressure sensor) that detects a pressure P2 within the fuel supply path 30b (i.e., the fuel supply path located downstream of the pressure reducing valve 31); a depressurizing valve 34 (corresponding to a depressurizing section) and a pressure responsive valve 35 that are provided in the fuel supply path 30b and that open the fuel supply path 30b to the atmosphere (corresponding to a low-pressure area) via an atmosphere communication path 40; and a controller 50 (corresponding to a control unit) that controls the overall operation of the fuel cell system.

The depressurizing valve 34 and the pressure responsive valve 35 are on-off valves that switch between a communication mode and a shut-off mode between the fuel supply path 30b and the atmosphere communication path 40. The depressurizing valve 34 is, for example, an electromagnetic valve or an injector, and opens or closes in accordance with a control signal from the controller 50. The pressure responsive valve 35 switches from a closed state to an open state when a built-in pressure-sensitive section thereof receives a predetermined upper limit pressure or higher.

The controller 50 is an electronic unit including a central processing unit (CPU) and a memory, and uses the CPU to execute a fuel-cell-system control program contained in the memory so as to control the operation of the fuel cell system.

The fuel cell 20 generates electric power by an oxidation-reduction reaction occurring between the hydrogen gas supplied from the hydrogen gas tank 10 via the fuel supply paths 30a and 30b and air serving as oxidant gas supplied from an oxidant-gas supplying section (not shown).

The controller 50 adjusts the amount of hydrogen gas and air to be supplied to the fuel cell 20 in accordance with required electric power of an electric load connected to the fuel cell 20 so as to control the amount of electric power to be generated in the fuel cell system.

When the fuel cell 20 is not generating electric power, the controller 50 closes the main stop valve 11 so as to shut off the supply of hydrogen gas from the hydrogen gas tank 10 to the fuel supply path 30*a*. When the power generating operation of the fuel cell 20 is stopped and the main stop valve 11 is closed in this manner, the fuel supply path 30*a* located upstream of the pressure reducing valve 31 is filled with high-pressure hydrogen gas.

The high-pressure hydrogen gas in the fuel supply path 30*a* located upstream of the pressure reducing valve 31 gradually diffuses toward the fuel supply path 30*b* located downstream thereof via the pressure reducing valve 31, causing the pressure in the fuel supply path 30*b* to increase with the diffusion.

Especially in a case where the installation space of the fuel cell system is limited and spreads over a wide area, as in a fuel-cell-powered vehicle, the fuel supply path 30*a* between the hydrogen gas tank 10 and the pressure reducing valve 31 is long, and the fuel supply path 30*a* between the main stop valve 11 of the hydrogen gas tank 10 and the pressure reducing valve 31 thus has a large capacity. Therefore, the fuel supply path 30*a* contains a large amount of high-pressure fuel.

Since this large amount of high-pressure fuel diffuses downstream, the pressure in the fuel supply path 30*b* located downstream of the pressure reducing valve 31 may sometimes exceed the maximum normal pressure value of the auxiliary unit 21. Supposing that the pressure rises to a level at which the auxiliary unit 21 possibly becomes inoperable, when the controller 50 opens the main stop valve 11 to resume the power generating operation of the fuel cell 20, there is a possibility that the fuel cell 20 cannot be activated due to the malfunction of the auxiliary unit 21.

Thus, the controller 50 performs a process for preventing such an inability to activate the fuel cell 20 caused by an increase in the pressure in the fuel supply path 30*b*. This process will be described below with reference to a flowchart shown in FIG. 2.

Figure 2:
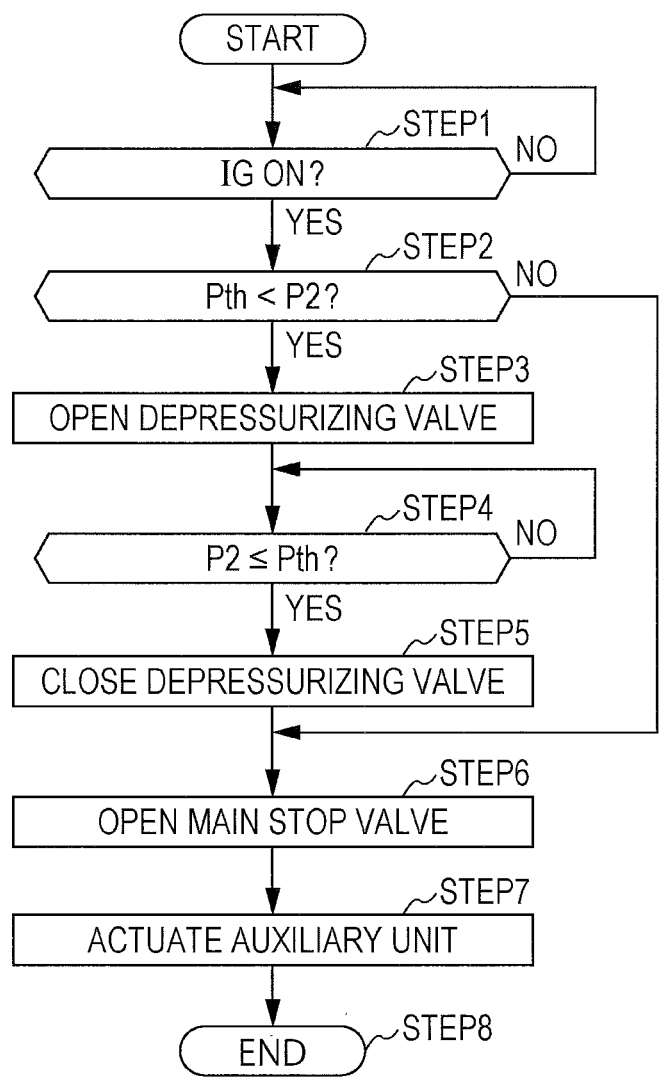
FIG. 2 is an operation flowchart corresponding to an activation process of the fuel cell system.

In step 1 in FIG. 2, the controller 50 determines whether or not an ignition (IG) switch (starter switch) of the fuel-cell-powered vehicle is turned on. When the IG switch is turned on, the process proceeds to step 2.

In step 2, the controller 50 determines whether or not the pressure P2 detected by the intermediate-pressure sensor 33 exceeds a threshold pressure Pth (set to near the maximum normal pressure value of the auxiliary unit 21). If the pressure P2 detected by the intermediate-pressure sensor 33 exceeds the threshold pressure Pth, the process proceeds to step 3, whereas if the pressure P2 detected by the intermediate-pressure sensor 33 is lower than or equal to the threshold pressure Pth, the process diverges to step 6.

The process performed by the controller 50 in step 2 for determining whether or not the pressure P2 detected by the intermediate-pressure sensor 33 has exceeded the threshold pressure Pth corresponds to a pressure determining step in a method for operating a fuel cell system according to the embodiment of the present invention.

In step 3, the controller 50 outputs a control signal to the depressurizing valve 34 so as to open the depressurizing valve 34. Thus, the hydrogen gas in the fuel supply path 30*b* is exhausted to the atmosphere (corresponding to the low-pressure area) from the atmosphere communication path 40 via the depressurizing valve 34 and an orifice 41.

The process performed by the controller 50 in step 3 for reducing the pressure in the fuel supply path 30*b* by opening the depressurizing valve 34 when the pressure P2 detected by the intermediate-pressure sensor 33 has exceeded the threshold pressure Pth corresponds to a pressure reducing step in the method for operating a fuel cell system according to the embodiment of the present invention.

As an alternative to the above example in which the hydrogen gas in the fuel supply path 30*b* is directly exhausted to the atmosphere from the atmosphere communication path 40, the atmosphere communication path 40 may be connected to a diluting section (not shown) so that the hydrogen gas is diluted with air before being exhausted to the atmosphere. As a further alternative, the hydrogen gas delivered to the atmosphere communication path 40 may be recovered and used in the fuel cell 20.

In step 4, the controller 50 waits until the pressure P2 detected by the intermediate-pressure sensor 33 decreases to the threshold pressure Pth or lower. When the pressure P2 detected by the intermediate-pressure sensor 33 decreases to the threshold pressure Pth or lower, the process proceeds to step 5 where the controller 50 closes the depressurizing valve 34.

Subsequently, the controller 50 opens the main stop valve 11 in step 6 and actuates the auxiliary unit 21 in step 7. Then, the process proceeds to step 8 where the process ends. Due to the opened main stop valve 11, the supply of hydrogen gas from the hydrogen gas tank 10 toward the fuel supply paths 30*a* and 30*b* commences with an appropriate pressure. Moreover, with the actuation of the auxiliary unit 21, the hydrogen gas is supplied to the fuel cell 20, thereby activating the fuel cell 20.

Figure 3:
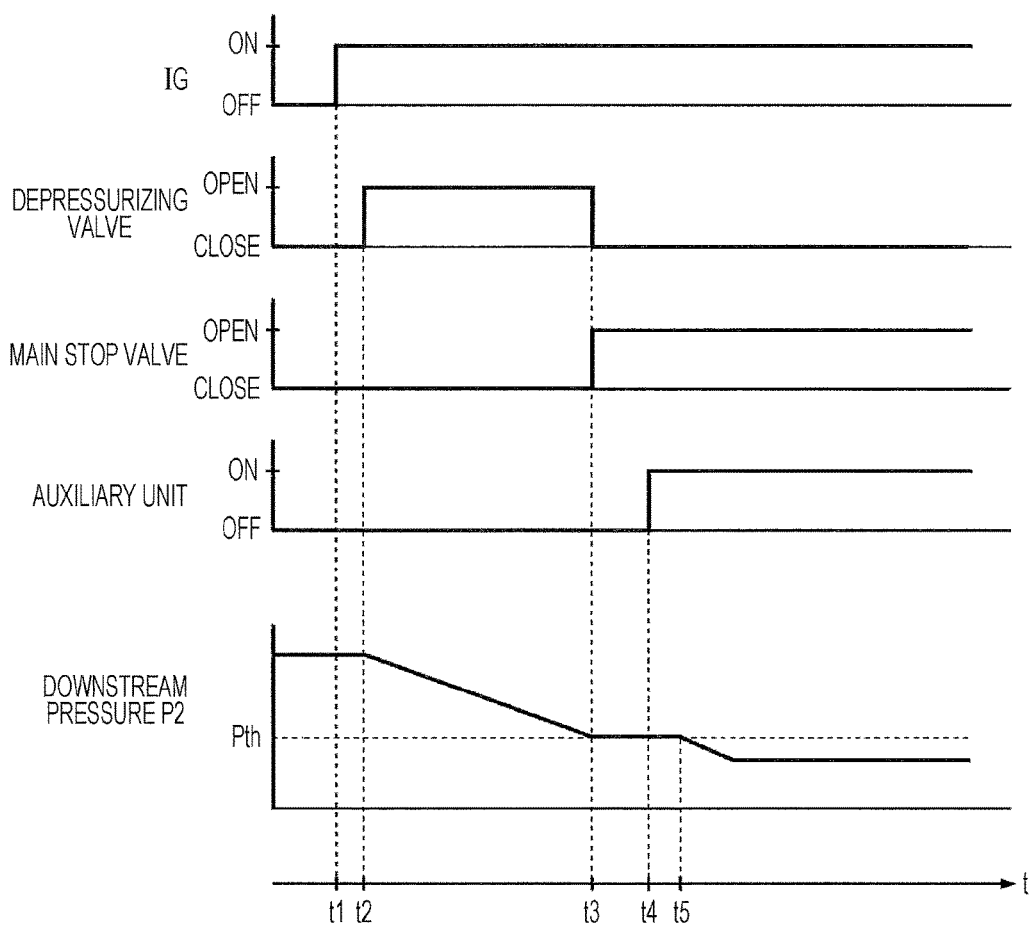
FIG. 3 is a timing chart corresponding to the activation process of the fuel cell system.

FIG. 3 is a timing chart showing the transition of the pressure P2 detected by the intermediate-pressure sensor 33 when the process according to the flowchart in FIG. 2 described above is performed. Specifically, beginning at the top, FIG. 3 illustrates changes in the IG switch, the depressurizing valve 34, the main stop valve 11, the auxiliary unit 21, and the pressure P2 detected by the intermediate-pressure sensor 33, relative to a common time axis t.

When the IG switch is turned on at time point t1, since the pressure P2 detected by the intermediate-pressure sensor 33 exceeds the threshold pressure Pth, the depressurizing valve 34 is opened at time point t2. By opening the depressurizing valve 34, the pressure P2 detected by the intermediate-pressure sensor 33 gradually decreases. When the pressure P2 decreases to the threshold pressure Pth or lower at time point t3, the depressurizing valve 34 is closed.

At time point t3, the main stop valve 11 is opened so as to start supplying the hydrogen gas from the hydrogen gas tank 10 toward the fuel supply paths 30*a* and 30*b*. At time point t4, the auxiliary unit 21 is actuated. In response to the actuation of the auxiliary unit 21, the fuel cell 20 starts to generate electric power. Due to consumption of hydrogen gas with the power generating operation, the pressure P2 detected by the intermediate-pressure sensor 33 decreases at time point t5.

According to the above-described process performed by the controller 50, when the fuel cell 20 is to be activated, the auxiliary unit 21 is actuated after reducing the pressure in the fuel supply path 30*b* located downstream of the pressure reducing valve 31 to the threshold pressure Pth or lower, thereby preventing an inability to activate the fuel cell 20 due to a malfunction of the auxiliary unit 21 caused by excessive pressure. If it is confirmed in advance that the pressure in the fuel supply path 30*b* located downstream of the pressure reducing valve 31 is lower than or equal to the threshold pressure Pth, the order of step 6 and step 7 may be interchanged.

In the present embodiment, when the fuel cell 20 is to be activated, the pressure P2 detected by the intermediate-pressure sensor 33 is checked and the pressure in the fuel supply path 30b is reduced by using the depressurizing valve 34. Alternatively, regardless of the state of the fuel cell 20, the pressure P2 detected by the intermediate-pressure sensor 33 may be constantly monitored while the controller 50 is in operation, and the pressure in the fuel supply path 30b may be reduced by using the depressurizing valve 34 when the pressure P2 exceeds the threshold pressure Pth.

Furthermore, in the present embodiment, even if there is a failure of the depressurizing valve 34, the pressure responsive valve 35 opens when the pressure in the fuel supply path 30b exceeds the upper limit pressure that is set to be higher than the threshold pressure Pth. Therefore, a pressure increase in the fuel supply path 30b can be avoided. It should be noted that the advantages of the embodiment of the present invention can still be achieved even in a case where the pressure responsive valve 35 is not provided.

Although the hydrogen gas tank 10 is provided as a fuel-gas supplying section in the present embodiment, a fuel-gas supplying section that generates and supplies hydrogen gas from fossil fuel by using a reformer may be provided as an alternative.

The embodiment of the present invention relates to a fuel cell system having a fuel cell, a fuel-gas supplying section, a fuel supply path that connects the fuel cell to the fuel-gas supplying section, a shut-off valve that switches between a supply mode and a shut-off mode for fuel gas supplied toward the fuel supply path from the fuel-gas supplying section, a pressure reducing valve that is provided in the fuel supply path between the shut-off valve and the fuel cell and that reduces a downstream pressure relative to an upstream pressure, and an auxiliary unit that is provided in the fuel supply path between the pressure reducing valve and the fuel cell and that is provided for activating the fuel cell.

The fuel cell system according to the embodiment of the present invention includes a pressure sensor that detects a pressure in the fuel supply path located downstream of the pressure reducing valve, a depressurizing section that reduces the pressure in the fuel supply path located downstream of the pressure reducing valve, and a control unit that causes the depressurizing section to reduce the pressure in the fuel supply path located downstream of the pressure reducing valve when the pressure detected by the pressure sensor exceeds a predetermined threshold pressure.

According to the embodiment of the present invention, when the pressure in the fuel supply path located downstream of the pressure reducing valve exceeds the threshold pressure, the control unit causes the depressurizing section to reduce the pressure in the fuel supply path located downstream of the pressure reducing valve. This can prevent an inability for the fuel cell to generate electric power, which may be caused when the auxiliary unit becomes inoperable due to an increase in the pressure in the fuel supply path located downstream of the pressure reducing valve owing to the fuel gas diffusing downstream from the upstream side of the pressure reducing valve.

In this case, it is not necessary to provide another shut-off valve in addition to the aforementioned shut-off valve (main stop valve). Moreover, since the depressurizing section is configured to reduce the pressure in the fuel supply path located downstream of the pressure reducing valve, which is lower than the pressure at the upstream side of the pressure reducing valve, the depressurizing section does not need to be large in size, unlike a shut-off valve provided in the fuel supply path located upstream of the pressure reducing valve. Therefore, increases in cost, weight, and volume of the fuel cell system can be suppressed, as compared with a case where a shut-off valve is provided upstream of the pressure reducing valve.

In fuel cell system according to the embodiment of the present invention, the control unit may determine whether or not the pressure detected by the pressure sensor exceeds the threshold pressure when the fuel cell is to be activated.

When the power generating operation of the fuel cell is stopped and the shut-off valve is closed, the pressure in the fuel supply path located downstream of the pressure reducing valve sometimes exceeds the threshold pressure due to the high-pressure fuel gas diffusing downstream from the upstream side of the pressure reducing valve. When the fuel cell is to be activated in this state, the control unit performs a process for reducing the pressure in the fuel supply path located downstream of the pressure reducing valve. This can prevent an inability to activate the fuel cell caused by a malfunction of the auxiliary unit due to an increase in the pressure in the fuel supply path located downstream of the pressure reducing valve.

In fuel cell system according to the embodiment of the present invention, if the pressure detected by the pressure sensor exceeds the threshold pressure when the fuel cell is to be activated, the control unit may cause the depressurizing section to reduce the pressure in the fuel supply path located downstream of the pressure reducing valve to the threshold pressure or lower, and subsequently open the shut-off valve and actuate the auxiliary unit so as to activate the fuel cell.

Accordingly, the control unit reduces the pressure in the fuel supply path located downstream of the pressure reducing valve to the threshold pressure or lower so as to supply the fuel and reliably actuate the auxiliary unit, whereby the fuel cell can be activated.

In fuel cell system according to the embodiment of the present invention, the depressurizing section may be a low-pressure open valve that is provided in the fuel supply path located downstream of the pressure reducing valve and that switches between a state in which the fuel supply path is in communication with a low-pressure area with a pressure lower than the threshold pressure and a state in which the fuel supply path is shut off from the low-pressure area. Moreover, the control unit may open the low-pressure open valve so as to reduce the pressure in the fuel supply path located downstream of the pressure reducing valve, and may include a pressure responsive valve that is provided in the fuel supply path located downstream of the pressure reducing valve and that switches from a closed state to an open state when the pressure in the fuel supply path located downstream of the pressure reducing valve exceeds an upper limit pressure set to be higher than the threshold pressure so as to allow the fuel supply path to communicate with the low-pressure area.

Accordingly, if the pressure in the fuel supply path located downstream of the pressure reducing valve cannot be reduced due to a failure of the pressure sensor or the depressurizing section, the control unit opens the pressure responsive valve so as to reduce the pressure in the fuel supply path located downstream of the pressure reducing valve. Therefore, a failure of the auxiliary unit for activating the fuel cell, caused by an excessive pressure applied to the auxiliary unit, can be prevented.

The embodiment of the present invention relates to a method for operating a fuel cell system having a fuel cell, a fuel-gas supplying section, a fuel supply path that connects the fuel cell to the fuel-gas supplying section, a shut-off valve that switches between a supply mode and a shut-off mode for fuel gas supplied toward the fuel supply path from the fuel-gas supplying section, a pressure reducing valve that is provided in the fuel supply path between the shut-off valve and the fuel cell and that reduces a downstream pressure relative to an upstream pressure, and a control unit.

The method for operating a fuel cell system according to the embodiment of the present invention includes a pressure determining step in which the control unit causes a pressure sensor to detect a pressure in the fuel supply path located downstream of the pressure reducing valve and determines whether or not the detected pressure exceeds a predetermined threshold pressure, and a pressure reducing step in which the control unit causes a depressurizing section to reduce the pressure in the fuel supply path located downstream of the pressure reducing valve when the pressure detected by the pressure sensor exceeds the threshold pressure.

According to the embodiment of the present invention, when it is determined in the pressure determining step that the pressure in the fuel supply path located downstream of the pressure reducing valve has exceeded the threshold pressure, the control unit causes the depressurizing section to reduce the pressure in the fuel supply path located downstream of the pressure reducing valve in the pressure reducing step. This can prevent an inability for the fuel cell to generate electric power, which may be caused when the auxiliary unit becomes inoperable due to an increase in the pressure in the fuel supply path located downstream of the pressure reducing valve owing to the fuel gas diffusing downstream from the upstream side of the pressure reducing valve.

In this case, it is not necessary to provide another shut-off valve in addition to the aforementioned shut-off valve (main stop valve). Moreover, since the depressurizing section is configured to reduce the pressure in the fuel supply path located downstream of the pressure reducing valve, which is lower than the pressure at the upstream side of the pressure reducing valve, the depressurizing section does not need to be large in size, unlike a shut-off valve provided in the fuel supply path located upstream of the pressure reducing valve. Therefore, increases in cost, weight, and volume of the fuel cell system can be suppressed, as compared with a case where a shut-off valve is provided upstream of the pressure reducing valve.

Obviously, numerous modifications and variations of the present invention are possible in light of the above teachings. It is therefore to be understood that within the scope of the appended claims, the invention may be practiced otherwise than as specifically described herein.

What is claimed is:

1. A method for operating a fuel cell system that includes a fuel cell, a fuel-gas supplier, a fuel supply path connecting the fuel cell to the fuel-gas supplier, a shut-off valve to switch between a supply mode and a shut-off mode for fuel gas supplied toward the fuel supply path from the fuel-gas supplier, a pressure reducing valve provided in the fuel supply path between the shut-off valve and the fuel cell to reduce a downstream pressure relative to an upstream pressure, and a controller, the method comprising:

detecting a pressure in the fuel supply path located downstream of the pressure reducing valve using a pressure sensor;

determining, during an activation process of the fuel cell, whether or not the pressure detected by the pressure sensor exceeds a predetermined threshold pressure; and reducing the pressure in the fuel supply path located downstream of the pressure reducing valve when the pressure detected by the pressure sensor during the activation process of the fuel cell exceeds the predetermined threshold pressure by controlling an open state and a closed state of a depressurizing device with the controller.

2. The method according to claim 1, wherein
if the pressure detected by the pressure sensor exceeds the predetermined threshold pressure when the fuel cell is activated, the controller controls the depressurizing device to reduce the pressure in the fuel supply path located downstream of the pressure reducing valve to the predetermined threshold pressure or to a pressure lower than the predetermined threshold pressure, and subsequently opens the shut-off valve and actuates an auxiliary device so as to begin generation of electric power by the fuel cell.

3. The method according to claim 2, wherein
the depressurizing device includes a low-pressure open valve provided in the fuel supply path located downstream of the pressure reducing valve, the low-pressure open valve being to switch the fuel supply path between a state in which the fuel supply path is in communication with a low-pressure area with a pressure lower than the predetermined threshold pressure and a state in which the fuel supply path is shut off from the low-pressure area, and
the controller opens the low-pressure open valve so as to reduce the pressure in the fuel supply path located downstream of the pressure reducing valve, and includes a pressure responsive valve provided in the fuel supply path located downstream of the pressure reducing valve, the pressure responsive valve being to switch from the closed state to the open state when the pressure in the fuel supply path located downstream of the pressure reducing valve exceeds an upper limit pressure set to be higher than the predetermined threshold pressure so as to allow the fuel supply path to communicate with the low-pressure area.

4. The method according to claim 2, wherein
the predetermined threshold pressure is set based on a maximum normal pressure value of the auxiliary device.

5. The method according to claim 2, further comprising:
opening the shut-off valve when the pressure in the fuel supply path located downstream of the pressure reducing valve decreases to the predetermined threshold pressure or lower; and
actuating the auxiliary device after opening the shut-off valve such that supply of the fuel gas to the fuel cell commences.

6. The method according to claim 1, wherein
the fuel cell is not activated until the pressure in the fuel supply path located downstream of the pressure reducing valve decreases to the predetermined threshold pressure.

7. The method according to claim 1, wherein
whether or not the pressure detected by the pressure sensor exceeds a predetermined threshold pressure is determined when an ignition switch is turned on.

8. The method according to claim 1, wherein the depressurizing device includes a low-pressure open valve provided in the fuel supply path located downstream of the pressure reducing valve, and the step of reducing the pressure in the fuel supply path located downstream of the pressure reducing valve includes changing the low-pressure open valve from the closed state to the open state.

9. The method according to claim 1, wherein the depressurizing device includes an electromagnetic valve or an injector that opens or closes in accordance with a control signal from the controller, and the step of reducing the pressure in the fuel supply path located downstream of the pressure reducing valve includes changing the electromagnetic valve or the injector from the closed state to the open state.

10. The method according to claim 1, further comprising controlling the depressurizing device with a control signal to enter the closed state when the pressure in the fuel supply path located downstream of the pressure reducing valve reaches the predetermined threshold pressure or a pressure lower than the predetermined threshold pressure.

11. The method according to claim 1, wherein the depressurizing device is controlled by the controller to be in the open state, and controlled by the controller to be in the closed state, after the controller determines that a starter switch has been turned on.

12. A method for operating a fuel cell system that includes a fuel cell, a fuel-gas supplier, a fuel supply path connecting the fuel cell to the fuel-gas supplier, a shut-off valve to switch between a supply mode and a shut-off mode for fuel gas supplied toward the fuel supply path from the fuel-gas supplier, a pressure reducing valve provided in the fuel supply path between the shut-off valve and the fuel cell to reduce a downstream pressure relative to an upstream pressure, a controller, and a depressurizing valve, the method comprising:

detecting a pressure in the fuel supply path located downstream of the pressure reducing valve using a pressure sensor;
   determining, during an activation process of the fuel cell, whether or not the pressure detected by the pressure sensor exceeds a predetermined threshold pressure;
   opening the depressurizing valve with the controller to reduce the pressure in the fuel supply path located downstream of the pressure reducing valve during the activation process of the fuel cell when the pressure detected by the pressure sensor exceeds the predetermined threshold pressure;
   closing the depressurizing valve with the controller after opening the depressurizing valve when the pressure in the fuel supply path located downstream of the pressure reducing valve reaches the predetermined threshold pressure or to a pressure lower than the predetermined threshold pressure; and
   actuating an auxiliary device after closing the depressurizing valve to begin generation of electric power by the fuel cell.

13. The method according to claim 12, wherein the depressurizing valve is an electromagnetic valve or an injector that opens or closes in accordance with a control signal from the controller, and the step of reducing the pressure in the fuel supply path located downstream of the pressure reducing valve includes changing the electromagnetic valve or the injector from the closed state to the open state.

14. The method according to claim 12, further comprising controlling the depressurizing device to enter the closed state with a control signal when the pressure in the fuel supply path located downstream of the pressure reducing valve reaches the predetermined threshold pressure or to a pressure lower than the predetermined threshold pressure.

15. The method according to claim 12, further comprising determining that a starter switch is turned on,
   wherein the steps of opening the depressurizing valve and closing the depressurizing valve are performed after determining that the ignition switch is turned on.

16. The method according to claim 1,
   wherein the fuel cell system includes a pressure responsive valve provided in the fuel supply path configured to switch to an open state from a closed state when the pressure in the fuel supply path exceeds an upper limit pressure, and
   wherein the reducing the pressure in the fuel supply path is performed while the pressure detected by the pressure sensor exceeds the predetermined threshold pressure while being below the upper limit pressure at which the pressure responsive valve switches to the open state.

17. The method according to claim 16, wherein the pressure responsive valve includes a pressure-sensitive section that causes the pressure responsive valve to switch to the open state when the pressure in the fuel supply path exceeds the upper limit pressure, which is a predetermined upper limit pressure.

18. The method according to claim 16, wherein the pressure responsive valve and the depressurizing device are disposed downstream of the shut-off valve and the pressure reducing valve.

19. The method according to claim 12,
   wherein the fuel cell system includes a pressure responsive valve provided in the fuel supply path configured to switch to an open state from a closed state when the pressure in the fuel supply path exceeds an upper limit pressure, and
   wherein the opening the depressurizing valve with the controller is performed while the pressure detected by the pressure sensor exceeds the predetermined threshold pressure while being below the upper limit pressure at which the pressure responsive valve switches to the open state.

20. The method according to claim 19, wherein the pressure responsive valve includes a pressure-sensitive section that causes the pressure responsive valve to switch to the open state when the pressure in the fuel supply path exceeds the upper limit pressure, which is a predetermined upper limit pressure.

21. The method according to claim 19, wherein the pressure responsive valve and the depressurizing valve are disposed downstream of the shut-off valve and the pressure reducing valve.

* * * * *